United States Patent [19]

Norton

[11] 4,198,454
[45] Apr. 15, 1980

[54] LIGHTWEIGHT COMPOSITE PANEL

[75] Inventor: Phil Norton, St. Louis, Mo.

[73] Assignee: American Air Filter Company, Inc., Louisville, Ky.

[21] Appl. No.: 955,490

[22] Filed: Oct. 27, 1978

[51] Int. Cl.² .............................................. B32B 3/12
[52] U.S. Cl. .................................... 428/117; 52/806; 89/36 A; 102/105; 109/84; 428/593; 428/911
[58] Field of Search ...................... 89/36 A; 102/105; 428/116, 73, 117, 118, 593, 911; 109/80, 82, 84; 52/806

[56] References Cited

U.S. PATENT DOCUMENTS

| | | | |
|---|---|---|---|
| 2,381,779 | 8/1945 | Scott | 428/911 X |
| 3,014,353 | 12/1961 | Scully et al. | 428/117 X |
| 3,645,216 | 2/1972 | Radford et al. | 428/117 X |
| 3,868,297 | 2/1975 | Jamison et al. | 428/118 X |
| 3,895,152 | 7/1975 | Carlson et al. | 428/116 |
| 4,034,138 | 7/1977 | Babayan | 428/395 X |

*Primary Examiner*—Henry F. Epstein
*Attorney, Agent, or Firm*—Jon C. Winger; Thomas G. Anderson

[57] ABSTRACT

A lightweight composite panel for use in constructing a portable or mobile enclosure capable of resisting penetration by small arms projectiles, explosive forces and heat having a multi-layered sandwiched construction. The layers include spaced apart metal panels with a honeycomb structure filled with a subliming material, a panel of projectile resisting material, and at least one panel of yieldable thermal insulation material disposed therebetween.

11 Claims, 2 Drawing Figures

LIGHTWEIGHT COMPOSITE PANEL

BACKGROUND OF THE INVENTION

The present invention relates generally to composite panels for constructing an enclosure, and more particularly to such a composite panel resistant to penetration by small arms projectiles, explosive forces and heat.

Examples of heretofore known composite panels and structures made therefrom are shown in U.S. Pat. No. 2,381,779 issued on Aug. 7, 1945 to F. S. Scott, U.S. Pat. No. 3,645,216 issued on Feb. 29, 1972 to Arthur S. Radford, and U.S. Pat. No. 3,868,297 issued to John Jamison et al.

In recent years it has become apparent that there is a requirement for a relatively lightweight composite panel structure for constructing a portable or mobile enclosure or shelter for military and commercial use.

In addition, more stringent military and commercial requirements are not satisfied by known composite panels.

Thus, there is a need for a lightweight structurally strong composite panel to be used for the construction of stationary but portable enclosures, such as bomb shelters and the like, and for mobile structures, such as armored vehicles and the like, which are capable of withstanding high temperatures and explosive forces generated by nuclear weapons, and of resisting penetration by small arms projectiles.

SUMMARY OF THE INVENTION

The present invention recognizes these needs and presents a solution which is straightforward and relatively inexpensive to manufacture.

More particularly, the present invention is a lightweight composite panel for use in constructing a portable or mobile enclosure capable of resisting small arms projectiles and withstanding explosive forces and heat, comprising a first metal panel and a second metal panel in spaced substantial parallelism to the first metal panel; a honeycomb configured panel disposed between the first and second panels in abutting juxtaposition to the first metal panel and oriented with the walls of the honeycomb configuration generally perpendicular to the plane of the first metal panel; a subliming material partially filling the cell structure of the honeycomb configured panel; a panel of lightweight projectile resisting material disposed between the honeycomb configured panel and the second metal panel; and a panel of yieldable thermal insulation material sandwiched between and in abutting juxtaposition to both the panel of lightweight projectile resisting material and the second metal panel.

BRIEF DESCRIPTION OF THE DRAWINGS

The preferred embodiments of the present invention will be described with reference to the accompanying drawings, wherein like numerals refer to like parts throughout the several views and in which.

DETAILED DESCRIPTION OF THE PREFERRED EMBODIMENT

Figure 1:
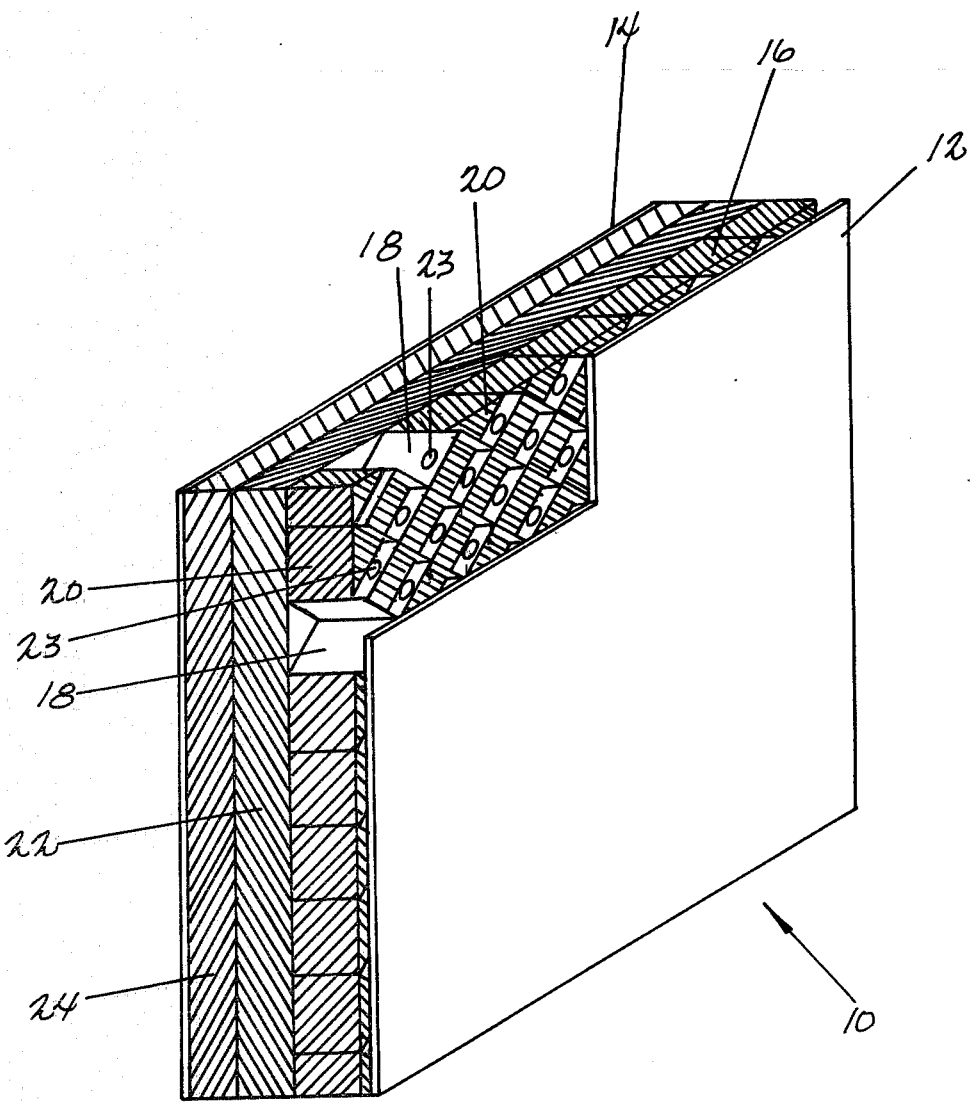
FIG. 1 is a perspective view of one embodiment with a portion removed to show the construction; and, FIG. 2 is a perspective view of another embodiment with a portion removed to show the construction.

FIG. 1 shows a lightweight composite panel 10 for use in constructing a portable or mobile enclosure capable of resisting penetration by small arms projectiles, explosive forces and heat generated by, for example, a nuclear explosion.

The panel 10 is comprised of a first metal panel 12 and a second metal panel 14 spaced from and in substantial parallelism with the first metal panel 12. A honeycomb configured panel 16 is disposed between the first and second metal panels 12 and 14 in abutting and adhering relationship with the first metal panel 12. The honeycomb panel 16 is oriented with its walls 18 generally perpendicular to the first metal panel 12, and a subliming or ablative material 20 at least partially fills the cells of the honeycomb configured panel 16. A panel 22 of lightweight projectile resistant material is disposed between the honeycomb configured panel 16 and the second metal panel 14. Next, a panel 24 of yieldable thermal insulating material is sandwiched between and in abutting juxtaposition to both the panel 22 of lightweight projectile resisting material and the second metal panel 14.

Figure 2:
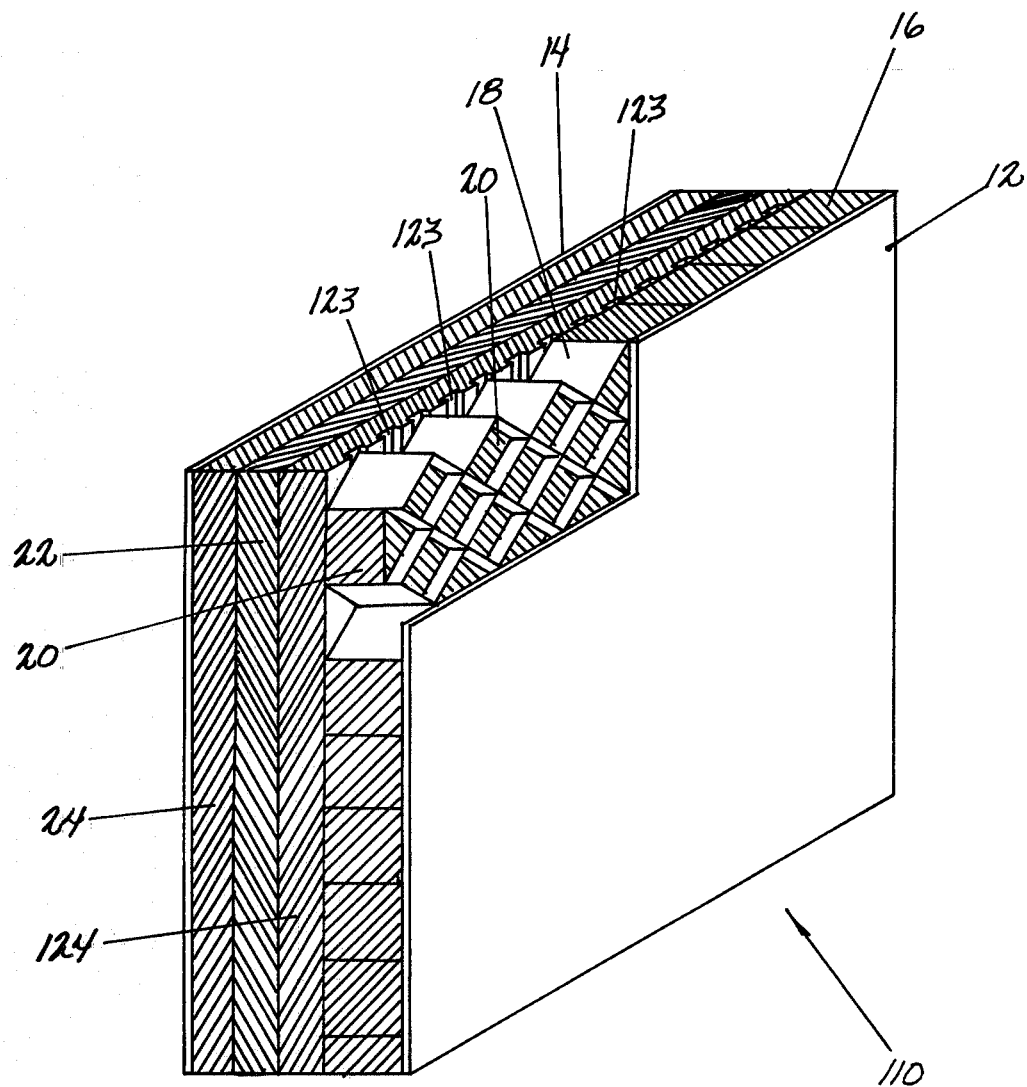

With reference to FIG. 2, there is shown a somewhat different embodiment in the form of a composite panel 110. This composite panel 110 is substantially identical in all respects to the composite panel 10 except that a second panel 124 of yieldable thermal insulating material is disposed between and in abutting juxtaposition to both the panel 22 of lightweight projectile resisting material and the honeycomb configured panel 16.

The various panels forming the composite panel 10 and 110 can be held together by virtually any suitable bonding agent such as, for example, heat sealing epoxy.

The first and second metal panels 12 and 14 contribute structural strength to the composite panels. In addition to structural strength, at least one of the panels 12 or 14, whichever one will be the exterior side of an enclosure must also be capable of withstanding the natural elements such as rain, snow, and the like, without deteriorating. The panels 12 and 14 can be fabricated of steel or aluminum of a gauge compatible with the requirements of structural strength and lightness, which requirements will vary with the size of the composite panel and the loads which the panel is to withstand.

The honeycomb configured panel 16 serves two functions. First, it adds structural strength to the composite panel 10, 110 and second it serves as a container for the subliming or ablative material 20. The honeycomb configured panel 16 can be fabricated of various materials such as paper or aluminum.

The subliming or ablative material 20 functions to dissipate large amounts of thermal energy over a short duration and may only partially fill the cell structure of the honeycomb configuration. The amount of subliming or ablative material used will be a function of the duration and intensity of the heat load the panel 10 is designed to withstand. An example of a suitable subliming or ablative material is sold under the trademark Thermolag.

The composite panel 10 must be provided with venting means for the vapor or gases produced by the subliming or ablative material 20 in the cell structure of the honeycomb configured panel 16. FIG. 1 illustrates one possible gas venting means which comprises an array of apertures 23 formed through the walls 18 of the honeycomb panel 16 so that the cells of the honeycomb configured panel 16 are in gaseous communication. Another possible gas venting means is illustrated in FIG. 2 and comprises a series of generally parallel channels 123 formed in the panel 24, 124 open to the cells of the honeycomb configured panel 16 so that each of the cells of the honeycomb configured panel 16 are in gaseous communication with those cells open to the same channel 123.

When a wall is constructed of a plurality of composite panels 10, the cells of the honeycomb configured panel 16 of adjacently disposed composite panels 10 will be in gaseous communication through either the apertures 23 depicted in FIG. 1 or the channels 123 depicted in FIG. 2. In either case, the pressure generated by the subliming or ablating material 20 will force the gas produced out of the cells of the honeycomb configured panels 10 through the apertures 23 or channels 123.

It is contemplated that appropriate gas outlet passages and gas exhaust ports will be provided in the enclosure constructed of the composite panels 10 for exhausting the gas from the panels 10 to the atmosphere.

The panels 24 and 124 of yieldable thermal insulating material also serve two functions. First, these panels 24, 124 prevent or diminish the amount of heat transfer through the composite panel 10, 110. Second, these panels 24, 124 allow the panel 22 of lightweight projectile resisting material to move upon impact by a projectile and absorb the energy of impact. The yieldable insulating material can be, for example, virtually any conventional material such as, for example, glass fibers or a foam.

The panel 22 of lightweight projectile penetration resistant material is used to prevent small arms bullets from penetrating the composite panel 10, 110 and entering the enclosure. This panel must be lightweight, therefore, conventional steel armor plate is unsuitable. The panel 22 can be fabricated of a lightweight nonmetallic material such as a ceramic fiber or high tensile strength woven fabric such as an aromatic polyamide fabric. This type of material yields somewhat when impacted by a projectile allowing the woven strands to cooperatively absorb the energy of the impacting projectile. As mentioned above, the panel 24, 124 will support and still allow the panel 22 of penetration resistant material to move or yield.

It is envisioned that the composite panel 10, 110 will protect the interior of an enclosure constructed using these panels for the duration of an event and then be reconstructed with new composite panels.

The foregoing detailed description is given primarily for clarity or understanding and no unnecessary limitations should be understood therefrom for modifications will be obvious to those skilled in the art upon reading this disclosure and may be made without departing from the spirit of the invention or the scope of the appended claims.

What is claimed is:

1. A lightweight composite panel for use in constructing a portable or mobile enclosure capable of resisting penetration by small arms projectiles, explosive forces and heat, comprising:
   a first metal panel;
   a second metal panel spaced in substantial parallelism to the first metal panel;
   a honeycomb configured panel disposed between the first and second metal panels in abutment to the first metal panel and oriented with the walls of the honeycomb configuration generally perpendicular to the first metal panel;
   a subliming material at least partially filling the cell structure of the honeycomb configured panel;
   a panel of lightweight projectile resisting material disposed between the honeycomb configured panel and the second metal panel;
   means for venting gas produced by the subliming material from the cell structure of the honeycomb configured panel; and,
   a panel of yieldable thermal insulation material sandwiched between and in abutting juxtaposition to both the panel of lightweight projectile resisting material and the second metal panel.

2. The composite panel of claim 1, wherein the means for venting gas comprises an array of apertures formed in the walls of the honeycomb configured panel thereby establishing gaseous communication between the cells of the honeycomb configured panel.

3. The composite panel of claim 1, further comprising a second panel of yieldable thermal insulation material disposed between and in abutting juxtaposition to both the panel of lightweight projectile resisting material and the honeycomb configured panel.

4. The composite panel of claim 3, wherein the means for venting gas comprises a plurality of channels formed in said second panel of yieldable thermal insulating material and open to the cells of the honeycomb configured panel thereby establishing gaseous communication between the cells of the honeycomb configured panel.

5. The composite panel of claim 3, wherein the means for venting gas comprises a plurality of apertures formed in the walls of the honeycomb configured panel thereby establishing gaseous communication between the cells of the honeycomb configured panel.

6. The composite panel of claim 5, wherein the means for venting gas comprises a plurality of channels formed in said second panel of yieldable thermal insulating material, the channels being open to the cells of the honeycomb configured panel thereby establishing additional gaseous communication between the cells of the honeycomb configured panel.

7. The composite panel of claim 1, wherein the panel of lightweight projectile resisting material is constructed of a lightweight non-metallic material.

8. The composite panel of claim 7, wherein the non-metallic material comprises a ceramic material.

9. The composite panel of claim 8, wherein the ceramic material is a ceramic fiber material.

10. The composite panel of claim 1, wherein the panel of yieldable thermal insulation material is of glass fiber composition.

11. The composite panel of claim 3, wherein:
    the first mentioned panel of yieldable thermal insulation material is of a glass fiber composition; and,
    the second panel of yieldable thermal insulation material is also of a glass fiber composition.

* * * * *